US006706775B2

(12) United States Patent
Hermann et al.

(10) Patent No.: US 6,706,775 B2
(45) Date of Patent: Mar. 16, 2004

(54) POLYURETHANE FOAM PRODUCTS WITH CONTROLLED RELEASE OF AGENTS AND ADDITIVES

(75) Inventors: Paul F. Hermann, Dover, NH (US); Wayne Celia, Paramus, NJ (US)

(73) Assignee: H. H. Brown Shoe Technologies, Inc., Fair Lawn, NJ (US)

( * ) Notice: Subject to any disclaimer, the term of this patent is extended or adjusted under 35 U.S.C. 154(b) by 16 days.

(21) Appl. No.: 10/115,338

(22) Filed: Apr. 2, 2002

(65) Prior Publication Data

US 2003/0191204 A1 Oct. 9, 2003

(51) Int. Cl.⁷ .............................................. C08L 75/08
(52) U.S. Cl. ...................... 521/134; 424/404; 424/445; 424/484; 521/137; 521/159; 521/170; 521/174
(58) Field of Search ................................. 521/134, 137, 521/159, 170, 174; 424/404, 445, 484

(56) References Cited

U.S. PATENT DOCUMENTS

| 2,999,013 A | 9/1961 | Meth |
| 3,805,532 A | 4/1974 | Kistner |
| 3,975,350 A | 8/1976 | Hudgin et al. |
| 4,137,200 A | 1/1979 | Wood et al. |
| 4,160,076 A | 7/1979 | Guthrie et al. |
| 4,202,880 A | 5/1980 | Fildes et al. |
| 4,209,605 A | 6/1980 | Hoy et al. |
| 4,226,944 A | 10/1980 | Stone et al. |
| 4,339,550 A | 7/1982 | Palinczar et al. |
| 4,914,170 A | 4/1990 | Chang et al. |
| 4,985,467 A | 1/1991 | Kelly et al. |
| 5,064,653 A | 11/1991 | Sessions et al. |
| 5,254,301 A | 10/1993 | Sessions et al. |
| 5,763,335 A | 6/1998 | Hermann |
| 5,916,928 A | 6/1999 | Sessions et al. |
| 5,976,616 A | 11/1999 | Celia |
| 5,976,847 A | 11/1999 | Hermann |
| 6,025,287 A | 2/2000 | Hermann |

*Primary Examiner*—John M. Cooney, Jr.
(74) *Attorney, Agent, or Firm*—Lerner, David, Littenberg, Krumholz & Mentlik, LLP

(57) ABSTRACT

Polyurethane foam products with controlled release of agents and additives, if any, are formed from the reaction products of an aqueous formulation of a limited quantity of superabsorbent polymer, an agent or agents from the group of detergents, abrasives, waxes, polishes, drugs, cosmetics, biologicals, volatiles, odor absorbing and controlling compositions and water soluble chemicals, optionally selective additives, and water with a predetermined ratio of hydrophilic urethane prepolymer to provide a polymerizing mixture. The agents and additives, if any, are incorporated directly into the matrix of the formed foam product to increase the number of times that the formed foam products can be used. The products and methods include a formed foam product with an abrasive material uniformly dispersed therein and/or formed on at least one exterior face of the products. Sized granular formed foam product can be comminuted to provide filters materials and animal litter.

21 Claims, No Drawings

POLYURETHANE FOAM PRODUCTS WITH CONTROLLED RELEASE OF AGENTS AND ADDITIVES

BACKGROUND OF THE INVENTION

The present invention relates generally to hydrophilic polyurethane foam composites used for various types of industrial, commercial, residential, personal care, cleaning and other products, and more particularly for pads, sheets, molded shapes or granules of material made of hydrophilic polyurethane foam which contains limited quantities of superabsorbent polymers to control the release of an agent or agents such as detergents, soaps, waxes, polishes, drugs, cosmetics, biologicals, volatiles and chemicals during the use thereof. Selectively abrasives can be added into or applied onto at least one surface of the formed product for additional applications and uses.

When an aqueous formulation of the present invention including superabsorbent polymer, agents and adequate water is mixed with a hydrophilic urethane prepolymer, as described in U.S. Pat. No. 5,976,847, the reaction produces polymerization and forms a hydrophilic polyurethane foam composite.

Conventional prior art urethane foam is mostly resistant and non-permeable to water. Some compositions have been treated with a surfactant in the formula to render the resultant urethane more acceptable to water. This type of surfactant-treated urethane will allow water to run along the supporting or intercellular structure but still disallow penetration into the urethane backbone.

Conventional prior art urethane foams require a stochiometric balance of water to isocyanate below approximately 0.05% addition of water or water-bearing agent in the formulation. This limits the amount of agent addition to the final composite. A further limitation of agent addition is the starting viscosity of conventional polyol components of the formula. Most additions of agent are added to the polyol component based on the high reactivity of the isocyanate component. The polyol component is typically relatively high in viscosity prior to any agent addition. Increasing its viscosity further by addition of agent quickly renders the resultant viscosity too high to pump and disallows the processing requirements of metering machinery. In addition to limited amounts of agent capable to be added is the major objection of conventional prior art urethane foams, that is, its water resistance. A composite foam product made with water-resistant or water-impermeable urethane coats or blocks the agent with its intended contact with an aqueous effluent. This defeats the original effort in adding the agent to the composite. The agent was added and intended to be available to interact with moisture bearing effluents in use.

Hydrophilic urethane foams of prior art are described in U.S. Pat. Nos. 4,137,200; 4,339,550; 5,976,847 and others, as well as in Polyurethane's Chemistry and Technology by Saunders and Frisch, Volume XVI Part 2, High Polymer Systems. The primary departure from conventional prior art non-hydrophilic urethane foam is in the polyol component. Utilizing a hydrophilic polyol reacted with isocyanate provides a hydrophilic prepolymer. Mixing said hydrophilic prepolymer with water results in a hydrophilic urethane foam. Adding an agent into the water results in a hydrophilic foam bearing the agent. If the hydrophilic foam composite including agent is subsequently contacted with an outside water-based effluent, the agent may interact with the effluent for an intended purpose. In this prior art hydrophilic foam composite technology, the contact between the agent and the effluent, or the expression of agent into effluent, is controlled by the inherent hydrophilicity of the urethane foam carrier.

For reasons above, it is needed to improve on the controlled release of agents in a urethane foam to sustain or improve the contact of agents added to composite.

SUMMARY OF INVENTION

It has been discovered that an improved controlled release urethane foam product in accordance with the present invention can be formed or obtained by combining an aqueous formulation consisting of a limited amount of superabsorbent polymer or copolymer, an agent or agents, optionally and selectively additives and adequate water with a hydrophilic urethane prepolymer. The agent or agents include, without limitation, detergents, soaps, waxes, polishes, abrasives, solid particles, drugs, cosmetics, biologicals, volatiles and chemicals. This improved composition slows and materially reduces the release of such agent or agents to a much greater extent than the known prior art products, when the pads, sheets and shaped products and granules such as sponges and particulate composition formed from such formulations are placed into use for cleaning, scrubbing, abrasion, waxing, polishing, coating, odor-controlling and absorption purposes, applications and other uses.

Thus, controlled release urethane foam product when used herein is a formed hydrophilic polyurethane foam, pad, sheet, molded shape or granular composition containing a limited quantity of superabsorbent polymer or copolymer and up to ninety percent (90%) solid filler or active agent or agents and optionally and selectively additives which, when exposed to an aqueous effluent, will enable the filler, agent or agents and additives, if any, to be gradually released for a given application or use.

DETAILED DESCRIPTION

Controlled release urethane foam products in accordance with the present invention differ from the impermeable characteristic of conventional hydrophilic urethane foam products formed in accordance with the prior art technology and are easily identifiable because of their water absorption capability in that they will swell up to one hundred fifty percent (150%) of their dry volume.

Additionally, the scrubbing and abrasive characteristic of such controlled release urethane foam products in accordance with the present invention can be designed or enhanced by adding abrasive particles to the aqueous phase during formulation of the foam products to improve the integral strength of the formed foam product.

Alternatively, an abrasive characteristic for the controlled release urethane foam product can also be obtained by forming on or laminating or adhesively bonding abrasive material to at least one exterior surface of the formed controlled release urethane foam product. The abrasive may be any composition or component that is more abrasive than the formed controlled release urethane foam product. Such laminated or adhesively bonded formed controlled release urethane foam products are particularly useful in formed foam products with a detergent agent that are used to clean hard surfaces such as pots and pans.

It has also been found that the controlled release urethane foam products formulated in accordance with the present invention, which include specific agents or additives such as biological agents or bacterial additives, can be ground or granulated to a predetermined size and, when enclosed in a filter housing, serve as a filter, for example, of noxious waste water. Another granulated form of the controlled release urethane foam product embodying a homogeneous mixture of odor control and absorption agents and a selected additive or additives will provide a litter composition for absorbing animal urine and semi-solids and for controlling noxious odors in animal litter boxes or, when placed in a suitable perforated housing or container, will control noxious odors from garbage, tobacco, diapers, vomit, liquor, gasoline, fish and other odoriferous substances.

Thus, in one aspect, the present invention covers hydrophilic polyurethane foam products with agents such as detergents, soaps, abrasives, waxes, polishes, drugs, cosmetics, biologicals, volatiles, chemicals and the like and optionally and selectively additives, formed into shaped and sized products, pads and sheets or granules in which the agents and/or additives, if any, are incorporated generally uniformly into the matrix or supporting structure of the formed foam to provide a controlled release urethane foam product formed from the reaction product obtained by combining an aqueous formulation having a limited quantity of a superabsorbent polymer or copolymer, an agent or agents and optionally and selectively additives and adequate water with a hydrophilic urethane prepolymer to produce a formed hydrophilic polyurethane foam product having unique properties such that, when wetted, the formed hydrophilic polyurethane foam product will act to slow the release of the agent or agents and any selected additive, if any, with the wetting effluent to enable the formed product to provide extra and additional applications or more intimate mass transfer of the agents and the selected additives, if any, during use than those presently obtainable from similar products now known in the prior art.

It is another aspect of the present invention to provide a method for formulating and forming such controlled release urethane foam products including the steps of:

a) metering and mixing an aqueous formulation having at least a limited quantity of superabsorbent polymer, an agent or agents and adequate water, with a predetermined ratio of hydrophilic urethane prepolymer to provide a polymerizing mixture for forming the controlled release urethane foam product;

b) depositing the polymerizing mixture on releasable bottom paper disposed on a movable carrier and covering the upper surface of the polymerizing mixture with releasable top paper as the polymerizing mixture is moved with the carrier;

c) advancing the polymerizing mixture in the top and bottom release paper by moving the carrier;

d) sequentially removing the top and bottom releasable paper while simultaneously drying the sized and formed product to remove residual moisture; and e) passing the formed controlled release urethane foam product to secondary operations such as die cutting, lamination and granulation to provide shaped and sized products and sized particulate products for particular applications and uses.

In another aspect of the present invention to provide a method for formulating and forming the controlled release urethane product step, all the steps are the same except that step c is modified as follows:

c) advancing the polymerizing mixture in the top and bottom release paper by moving the carrier and sizing the foam layer being formed to the desired layer until it is tack free;

It is another aspect of the present invention to provide a method for formulating and forming such controlled release urethane foam products particularly adapted for low temperature exothermic reactions to aid where the formulation includes at least one heat sensitive agent or additive including the steps of:

a) metering and mixing an aqueous formulation having at least a quantity of superabsorbent polymer, an agent or agents and adequate water, with a predetermined ratio of hydrophilic urethane prepolymer to provide a polymerizing mixture for forming the controlled release urethane foam product;

b) dispensing a predetermined quantity of the polymerizing formulation into at least one releasable mold to form a shaped and sized controlled release urethane foam product;

c) applying a cover onto the releasable mold to control the expansion of the polymerizing mixture; and d) removing the molded controlled release urethane foam product from the at least one mold and removing a predetermined quantity of the residual moisture therefrom.

It is another aspect of the present invention to provide formed shaped and sized controlled release urethane foam products with abrasive characteristics from a polymerized combination of an aqueous mixture having, a limited quantity of a superabsorbent polymer, agents from the group of detergents and/or soaps, a sized quantity of abrasive particles and adequate water with a predetermined quantity of hydrophilic urethane prepolymer, in which the agent or agents including the abrasive particles are incorporated into the matrix or supporting or intercellular structure of the formed foam to provide unique properties for improving the cleaning and scrubbing characteristics for the formed controlled release urethane foam product.

It is another aspect of the present invention to provide a method for formulating and forming such controlled release urethane foam products with abrasive particles homogeneously dispersed therethrough including the steps of:

a) metering and mixing an aqueous formulation having at least a quantity of superabsorbent polymer, an agent or agents, a sized quantity of abrasive particles and adequate water with a predetermined ratio of hydrophilic urethane prepolymer to provide a polymerizing mixture for forming the controlled release urethane foam product with abrasive characteristics;

b) depositing the polymerizing mixture on releasable bottom paper disposed on a movable carrier and covering the upper surface of the polymerizing mixture with releasable top paper as the polymerizing mixture is moved with the carrier;

c) advancing the polymerizing mixture in the top and bottom release paper by moving the carrier and sizing the foam layer being formed to the desired thickness until it is tack free;

d) sequentially removing the top and bottom releasable paper while simultaneously drying the sized and formed product to remove residual moisture; and e) passing the formed controlled release urethane foam product with abrasive characteristics to secondary operations such as die cutting, to provide shaped and sized products for particular applications and uses.

Alternatively, as another aspect of the present invention, the method for formulating and forming such controlled release urethane foam product with abrasive particle homogeneously dispersed in the formed matrix thereof may also be obtained by dispersing a predetermined quantity of the polymerizing mixture into a sized and shaped releasable mold, as above set forth, for providing molded controlled release urethane foam products.

It is another aspect of the present invention to provide formed shaped and sized controlled release urethane foam products with abrasive characteristics on at least one exterior surface from a polymerized combination of an aqueous mixture having, a limited quantity of a superabsorbent polymer, agents from the group of detergents and/or soaps, and adequate water with a predetermined quantity of hydrophilic urethane prepolymer so that the agents are incorporated into the foam matrix during polymerization, and on at least one exterior surface of the formed foam product, an integral abrasive exterior is formed to improve cleaning and scrubbing characteristics of the formed product.

It is another aspect of the present invention to provide a method for formulating and forming such controlled release urethane foam products with an integral abrasive layer on at least one exterior surface including the steps of:

a) metering and mixing an aqueous mixture having, at least a limited quantity of superabsorbent polymer and an agent from the group detergents, and/or soaps and adequate water, with a predetermined ratio of hydrophilic urethane prepolymer to provide a polymerizing mixture for forming the foam layer of the formed product;

b) depositing the polymerizing mixture onto an abrasive medium coated on and movable with releasable bottom paper disposed on a movable carrier and covering the upper surface of the polymerizing mixture with releasable top paper as the polymerizing mixture is moved with the carrier;

c) advancing the polymerizing mixture on the abrasive medium and in the top and bottom release paper by moving the carrier and sizing the foam layer being formed to the desired thickness until it is tack free;

d) sequentially removing the top and bottom releasable paper and removing residual moisture; and e) passing the formed controlled release urethane foam product with the abrasive layer integral with at least one exterior surface to the secondary step of die cutting, to provide products with enhanced cleaning and scrubbing characteristics.

It is another aspect of the present invention to provide a further method for formulating and forming such controlled release urethane foam products with an integral abrasive layer on at least one exterior surface including the steps of:

a) metering and mixing an aqueous mixture having, at least a limited quantity of superabsorbent polymer and an agent from the group detergents, and/or soaps and adequate water, with a predetermined ratio of hydrophilic urethane prepolymer to provide a polymerizing mixture of the composite material;

b) dispensing a predetermined quantity of the polymerizing mixture so as to partially fill a sized and shaped mold cavity;

c) die cutting a sized layer of non-woven abrasive material to the shape of the mold cavity;

d) bringing the shaped non-woven abrasive material into intimate contact with and covering the polymerizing mixture;

e) placing a cover member on the shaped mold to limit the polymerization to provide the controlled release urethane foam product in the size and shape of the mold cavity; and f) removing the sized and shaped controlled release urethane foam product with an integral abrasive material on at least one exterior face and removing a predetermined amount of the residual moisture there from.

It is another aspect of the present invention to provide a method for formulating and forming such controlled release urethane foam products with an integral abrasive layer, either laminated or adhered on at least one exterior surface, including the steps of:

a) metering and mixing an aqueous formulation having at least a limited quantity of superabsorbent polymer, an agent or agents and adequate water, with a predetermined ratio of hydrophilic urethane prepolymer to provide a polymerizing mixture for forming the controlled release urethane foam product;

b) depositing the polymerizing mixture on releasable bottom paper disposed on a movable carrier and covering the upper surface of the polymerizing mixture with releasable top paper as the polymerizing mixture is moved with the carrier;

c) advancing the polymerizing mixture in the top and bottom release paper by moving the carrier;

d) sequentially removing the top and bottom releasable paper while simultaneously drying the sized and formed product to remove residual moisture;

e) laminating or adhering an integral abrasive layer onto at least one exterior face of the formed controlled release urethane foam product; and f) passing the formed controlled release urethane foam product with the abrasive layer on at least one exterior surface to the secondary steps of die cutting to provide products with enhanced cleaning and scrubbing characteristics.

It is a still further aspect of the present invention to provide a ground or granulated controlled release urethane foam product in accordance with the present invention to absorb and retain various liquids and semi-solids and to control noxious odors from a polymerized combination of an aqueous mixture having, a limited quantity of superabsorbent polymer, a selected acid, neutral and alkaline odor control agent or agents and optionally and selectively additives and adequate water with a predetermined quantity of hydrophilic urethane prepolymer to provide the formed composite formulated and comminuted to the desired particle size for the given application and use.

It is a still further aspect of the present invention to provide a method for formulating a ground or granulated controlled release urethane foam product for the control of obnoxious odors and adapted to absorb various liquids or semi-solids and for the control of noxious odors including the steps of:

a) metering and mixing an aqueous formulation having at least a limited quantity of superabsorbent polymer, at least one acid, neutral and alkaline odor control agent or agents, optionally and selectively additives and adequate water with a predetermined quantity of hydrophilic urethane prepolymer to provide a polymerizing mixture for forming the controlled release urethane foam product with absorption characteristics and the control of noxious odors;

b) depositing the polymerizing mixture on releasable bottom paper disposed on a movable carrier and covering the upper surface of the polymerizing mixture with releasable top paper as the polymerizing mixture is moved with the carrier;

c) advancing the polymerizing mixture in the top and bottom release paper by moving the carrier and sizing the foam layer being formed to the desired thickness until it is tack free;

d) sequentially removing the top and bottom releasable paper while simultaneously drying the sized and formed product to remove residual moisture; and e) passing the formed controlled release urethane foam product to a comminuting device set to provide the desired particle size for the formed product and the particular applications and uses.

Controlled release urethane foam products in accordance with the present invention take various forms because of the myriad of agents that can be embodied into the matrix or supporting structure of the formed foam product and the multiplicity of applications and uses to which such products can be applied or adapted.

One basic form of the controlled release urethane foam products in accordance with the present invention is formulated and formed, as hereinafter more fully described, by combining an aqueous mixture of a limited quantity of superabsorbent polymer, one or more agents from the group, detergents, soaps, abrasives, waxes, polishes, biologicals, volatiles and the like materials, and additionally, optionally and selectively additives, if any, with a predetermined ratio of a hydrophilic urethane prepolymer to provide a polymerizing mixture so that during polymerization the agent or agents and any additive, if any, will be incorporated and bound into the matrix or supporting structure of the formed urethane foam product.

The superabsorbent polymers in such formulations are preferably sodium polyacrylate/polyalchohol polymers and co-polymer sorbents described in U.S. Pat. Nos. 5,763,335 and 4,914,170, purchasable in the commercial marketplace and commented on more fully below.

The detergent agents used in the formulation of the controlled release urethane foam products are those surfactant chemicals commonly available and known to those skilled in the art to satisfy hard surface cleansing, skin cleansing, rug cleansing and other cleaning tasks such as sodium alpha olephin sulphonate, sodium lauryl sulfate, dodecylbenzene sulphonic acid, ethoxylated alcohol, sodium xylene sulfonate, cocamide dea and detergents sold as "LYSOL APC, SIMPLE GREEN, 409, MR. CLEAN, SOFT-SCRUB, RESOLVE CARPET CLEANSER", etc. all registered trademarks. In some cases more than one agent may be utilized as a function of the application or use for the controlled release urethane foam product. In this regard a multitude of anionic, cationic, nonionic and zwitterionic surfactants can be found in various technical publications such as Advanced Cleaning Product Formulations by Ernest W. Flick in four volumes, listing over 2,000 formulations for up to 10,000 listed detergents.

The abrasive agents used in the formulation of the controlled release urethane foam products are classified into at least two groups. The first group would be particles that have (a) low abrasive qualities such as diatomaceous earth, (b) medium abrasive qualities such as feldspar, and (c) high-abrasive qualities such as silica. The second group would be sheet stock abrasives in the form of (a) non-woven fiber such as those commercially available as Scotchbrite®, floor cleaning pads and Buf-Puff®; (b) woven or paper adhesively bonded sheets such as sandpaper; and (c) naturally occurring abrasive materials such as Loofah, Apricot Seed, crushed Walnut shell, crushed Jojoba shell and the like. Abrasives will function to polish, abrade or remove substrate materials over which the foam composite is rubbed.

The wax agents used in the formulations of the controlled release urethane foam products are materials which impart a shine on a secondary surface with which they are brought in contact and include crystalline waxes, paraffin waxes, wax emulsions and silicone fluids such as:

| WAX AGENT | POLISHING APPLICATION | | | | |
| --- | --- | --- | --- | --- | --- |
| | Vinyl | Furniture | Metal | Shoe | Auto |
| Crystalline wax | | X | | X | X |
| Paraffin wax | | X | | X | X |
| Wax emulsions | | X | | X | |
| Silicone fluids | X | X | X | X | X |

The drug agents used in the formulation of the controlled release urethane foam products may be any medicament or pharmaceutical used to alter the body response such as vitamins, analgesics, vaccines, spermicides and the like.

| DRUG AGENT | APPLICATION |
| --- | --- |
| Ben Gay | Analgesic wrap |
| Desitin | Diaper rash protective pad |
| Vitamin C | Skin enhancement |
| Nonoxynol 9 | Contraceptive |
| Iodine | Germ Kill |

The cosmetic agents used in the formulation of the controlled release urethane foam products are those chemical materials established to alter the external appearance, feel or smell of a human or animal body such as, by way of illustration and not limitation, skin conditioners, hair color dyes, hair shampoos, fragrances, lip glosses, nail polishes, aqueous dispersible body powders and liquid emulsions, etc.

| COSMETIC AGENT | APPLICATION |
| --- | --- |
| Sodium laurol sarcosinate | maximizes suds |
| Sodium laureth sulphate | copious suds |
| Anionic surfactants | skin cleaning |
| Citric acid | PH modifier |
| Isothionate | skin softener |

The biological agents used in the formulation of the controlled release urethane foam products are those materials produced by or consisting of live cells that react with aqueous effluent which include, by way of illustration and not limitation, bacteria, plant cells, viruses, algae and fungi.

| BIOLOGICAL AGENT | APPLICATION |
| --- | --- |
| Azolla (plant) | scrub heavy metals |
| Jimson weed (plant) | scrub radioactivity |
| Chlorella (green algae) | scrub heavy metals |
| Pseudomonas (bacteria) | scrub heavy metals |
| Yeast strain R14 (yeast) | scrub heavy metals |

The chemical agents used in the formulation of the controlled release urethane foam products not specifically embodied in the agents as above identified include materials intended to enable a secondary reaction when the formed foam product is contacted by an aqueous effluent such, for example, as follows:

| THE AGENT OR ADDITIVE | APPLICATION OR USE |
| --- | --- |
| Human Blood | Absorb oxygen from water |
| Odor Absorbent | Destroy noxious odor materials |
| Phase Change Agents | Absorb and release BTUs |
| Baking Soda Agents | Alkalize acid solutions |
| Cellulose Fibers | Absorption and tensile strength |

Any of the agents from the groups enumerated may first be formed in an aqueous premix solution with a typical surfactant material and then added to the aqueous mixture to be combined with the hydrophilic urethane prepolymer. Surfactants may be used with the agents in the aqueous mixture to increase the concentration of the selected agent or agents in the aqueous mixture. The surfactants are preferably present in amounts of about 0.5% to about 3.5% by weight of the aqueous mixture. The surfactants may be prepared from anionic polyoxyethylene and polyoxypropylene oxides such as BASF surfactant, available under the trademark "PLURONIC". Other surfactants known as anionics, cationics and or zwitterionics, singularly or in combination, can be added to the formulation, as known by those skilled in the art, to satisfy specific needs.

The aqueous mixture may further consist of various combinations of other selected additives without departing from the scope of the present invention, including, for example, germicides, bactericides and fungicides. Such products are provided in the commercial marketplace by a myriad of suppliers for controlling germs, or bacterial and fungal growth. One preferred material available in the commercial marketplace is supplied by Lauricidin Co. of Galena, Ill. 61036, under the trademark "LAURICIDIN".

In those applications desiring biocidal protection, the selected agent is added into the aqueous phase at the proper rate so as to function yet be safe to handle. A typical additive of such agent is less than 1% by weight of the aqueous phase.

In addition, volatile agents and volatile additives may be used in the formulation of the controlled release urethane foam products in accordance with the present invention. Such volatiles are materials having a low boiling or subliming temperature at atmospheric pressure that vaporize to produce a secondary reaction as is the case with fragrances and solvents.

Thus, an agent or agents, when used herein, are any active ingredients added to the composite foam product prior to polymerization that will provide a desired end result for the application and use of the formed controlled release urethane foam products. Accordingly, the agents as set forth above are only by way of illustration and not limitation of the formed controlled release urethane foam products in accordance with the present invention.

During polymerization, the selected agents and the selected additives, if any, are incorporated homogenously into the matrix or supporting structure of the formed foam pads layers, sheets and granulated products and remain there until the formed foam pads, layers, sheets or granulated products are wetted or contacted by sufficient moisture to activate the agents in such formed foam products, at which time one or more of the agents are slowly released from the matrix or supporting structure and diffuse toward the surface, where they can be put to use for cleaning, scrubbing, waxing, polishing, controlling noxious odors, as the case may be, for a given agent or agents and the selected additive, if any, for a given application or use. It is to be noted that in some cases the agent may be added to the prepolymer rather than the aqueous phase, particularly when the agent is anhydrous or oil-based.

The formation of such formed controlled release urethane foam products in accordance with the present invention is achieved in accordance with the following steps:

a) First, is the metering and mixing of an aqueous mixture including a limited quantity of superabsorbent polymer, at least one agent from the enumerated group of agents for the specific application or use and adequate water with a predetermined ratio of hydrophilic prepolymer to provide a polymerizing mixture;

The aqueous mixture is prepared by conventional batch mixing processes incorporating the selected agent or agents in a volume to satisfy the intended application and use. Thus the water is added first, the agent is blended in or emulsified in with a surfactant, then the superabsorbent polymer is added and the aqueous mixture is intimately blended.

This aqueous mixture includes, the superabsorbent polymer in a range from 0.05% to 10% by weight, and preferably about 0.6% by weight, at least one or more of the group of agents from 0.1 to 15% by weight and preferably 6% by weight, water in a range from 15% to 85% by weight and preferably about 30% by weight with hydrophilic urethane prepolymer in a range from 0.25% to 80% by weight and preferably 30% by weight.

Hydrophilic urethane prepolymer available in the commercial marketplace is a water reactive 10,000–20,000 cps liquid which must be intimately mixed with the above described aqueous mixture of a limited quantity of superabsorbent polymer, agent or agents, and optionally selected additives to initiate polymerization.

Suitable hydrophilic urethane prepolymer for use in the present invention are known and will be readily recognized by those of ordinary skill in the art from U.S. Pat. Nos. 5,763,335; 4,209,605; 4,160,076; 4,137,200; 3,805,532; 2,999,013; and general procedures for the preparation and formation of such prepolymers can be found in Polyurethane's Chemistry and Technology by J. H. Saunders and K. C. Frisch published by John Wiley & Sons, New York, N.Y., at Vol. XVI Part 2. High Polymer Series. "Foam Systems", pages 7–26, and "Procedures for the Preparation of Polymers", pages 26 et seq. One preferred prepolymer for use in the present invention is sold under the trademark BIPOL 6 by Mace Adhesives and Coatings. Another prepolymer suitable for use in the present invention is sold under the trademark HYPOL by The Dow Chemical Company. Still another prepolymer for use in the present invention is sold under the trademark PREPOL by Lendall Manufacturing Incorporated. These prepolymers are suitable for the present invention because of their strong hydrophilic characteristic and reasonable cost.

Admixing the aqueous mixture with a predetermined ratio of precise amounts of the hydrophilic urethane prepolymer initiates polymerization. The physical characteristics such as density and tensile strength are controlled by the ratio of prepolymer in the aqueous mixture to produce a sized and shaped controlled release urethane foam product in accordance with the present invention. Contacting the polymerized foam product with a moisture bearing effluent will expose the homogenously incorporated agent to effluent.

b) The combined polymerizing aqueous mixture is deposited on a sheet of releasable bottom paper disposed on a movable carrier and a sheet of releasable top paper is applied to cover the upper surface of the polymerizing aqueous mixture;

c) This polymerizing aqueous mixture in the top and bottom releasable paper is then advanced by moving the carrier, and optionally the forming foam layer can be sized to a desired thickness and either air dried or oven dried until it becomes tacky;

d) Next, the top releasable paper covering and the bottom releasable paper are sequentially removed, and the formed controlled release urethane foam product can be further dried in any suitable manner to remove the residual moisture; and Steps b, c and d for forming a hydrophilic urethane foam product are well known in the art and therefore will not be more fully described.

e) Now the formed controlled release urethane foam products is next passed to secondary operations such as die cutting, molding and granulation, as may be required to shape and size the formed foam product for the particular application and use.

Such secondary operations are also well known in the art and accordingly will not be more fully described.

Adding abrasive materials to the controlled release urethane foam products to provide a formed foam product with abrasive qualities may be established by several methods depending on the nature of the product required for a particular application or use.

Thus, in one form of controlled release urethane foam products with abrasive qualities, the abrasive can be uniformly and homogeneously dispersed throughout the matrix or supporting structure of the formed foam product by premixing the selective abrasive particles in a thickener, and then adding this to the batch mixing step for forming the aqueous mixture before it is combined with the hydrophilic urethane prepolymer to start polymerization, as is set forth above, for formulating the basic controlled release urethane foam products.

When polymerization is commenced by combining this aqueous mixture with the hydrophilic urethane prepolymer, the abrasive particles will be uniformly and homogeneously dispersed throughout the formed foam product and will act to maintain the integrity and strength of the formed foam product for the applications and uses requiring a controlled release urethane foam product with abrasive qualities.

In an alternate method the controlled release urethane foam product can be formed having an abrasive material formed integrally on at least one exterior surface. This method requires the steps of:

a) metering and mixing of an aqueous formulation including a limited quantity of superabsorbent polymer, at least one agent from the enumerated group of agents for the specific application or use and adequate water with a predetermined ratio of hydrophilic prepolymer to provide a polymerizing mixture;

b) dispensing a predetermined quantity by weight of the polymerizing mixture into a shaped mold cavity so as to partially fill the cavity;

c) forming a separate die cut of non-woven abrasive shaped to fit into the mold cavity and placing one surface of the die-cut non-woven abrasive into engagement with the surface of the polymerizing mixture before polymerization is complete; and d) placing a top cover on the mold cavity to define and size the polymerizing mixture and to bond the die-cut abrasive non-woven layer to the formed controlled release urethane foam product.

In still another alternative method, the controlled release urethane foam product can be formed having an abrasive material formed integrally on at least one exterior surface. This method requires the steps of:

a) metering and mixing of an aqueous formulation including a limited quantity of superabsorbent polymer, at least one agent from the enumerated group of agents for the specific application or use and adequate water with a predetermined ratio of hydrophilic prepolymer to provide a polymerizing mixture;

b) sequentially depositing the desired abrasive material such as non-woven or fabric-backed sandpaper on releasable bottom paper disposed on a movable carrier and then dispensing the polymerizing mixture onto the abrasive medium;

c) covering the exposed upper surface of the polymerizing mixture with releasable top paper;

d) advancing the polymerizing mixture on the abrasive medium in the top and bottom releasable paper by moving the carrier and sizing the foam layer being formed to the desired thickness until it is tack free;

e) sequentially removing the top and bottom releasable paper and removing residual moisture; and f) passing the formed foam product for secondary operations such as die cutting to provide the product for the given applications and uses.

As still another alternative, the controlled release urethane foam product can be formed having an abrasive layer applied to at least one exterior surface of the formed foam product. This alternative utilizes all the steps for forming the basic controlled release urethane foam product as above described and then adds a secondary step wherein the abrasive layer is laminated or adhered to at least one exterior surface of the formed foam product.

Thus, the method for forming a controlled release urethane foam product with an abrasive layer applied to at least one exterior surface includes the steps of:

a) metering and mixing of an aqueous formulation including, a limited quantity of superabsorbent polymer, at least one agent from the enumerated group of agents and adequate water with a predetermined ratio of hydrophilic urethane prepolymer to form a polymerizing mixture;

b) dispensing the polymerizing mixture onto a releasable bottom paper disposed on a movable carrier;

c) covering the upper surface of the polymerizing mixture with releasable top paper;

d) advancing the polymerizing mixture in the top and bottom releasable paper by moving the carrier until it is tack free and optionally sizing the formed foam layer to the desired thickness;

e) sequentially removing the top and bottom releasable paper and removing residual moisture;

f) passing the formed foam product to the secondary operation of laminating or adhesively attaching, a layer of abrasive material from the group of abrasive non-woven sheets, abrasive woven sheets and natural abrasives, to at least one exterior face of the formed controlled release urethane foam product; and g) die cutting and shaping and sizing the formed controlled release urethane foam product with an abrasive layer on at least one exterior face for the given application and use.

The present invention may also be formulated as a composition of dry particles with odor control agents uniformly dispersed therethrough so that the formed controlled release urethane foam product in the sized and shaped particulate form can act both to absorb and retain noxious liquids such as urine and semi-solid waste materials such as feces and also control or modify noxious odors.

While the particulate form of the controlled release urethane foam product with odor control agent is particularly adapted for use as an animal litter for the absorption and retention of animal urine and feces and for controlling or modifying the noxious odors associated therewith, it also can be applied for the absorption, adsorption, retention, control and modification of pleasant odors or for noxious odors emanating from garbage, tobacco, kitchens, bathrooms, bedding and other sources, for example, by the use in filters or perforated containers containing quantities of the granular materials or when possible by direct sprinkling or contact.

Prior art animal litters composed of clays, shredded paper, wood chips and inorganic fiber have claimed the ability to remove odor and agglomerate urine. Control of odor in prior art is attempted by masking or absorbing. Masking is defined as overpowering the objectionable odor with an acceptable odor. Absorbing is defined as trapping the odor in a porous shell. It has been discovered that both solutions represent problems:

Masking Agent Problems
1. hard to distribute uniformly in each particle
2. ceases to function after evaporation
3. high volume required to make up for evaporation
4. known to create animal aversion to using litter Absorbent Agent Problems
1. differential density and particle size causing separation
2. odor releases with stress or temperature Also, prior art litter suffers from maintaining its structural integrity wherein urine excretions in the form of a liquid stream dissolve particles, leaving a puddle of urine on the floor of the litter box. The puddle is then prevented from contact with any means of odor control in prior art litter. This uncontrollable odor generation can necessitate a change of the entire box of animal litter. Clumping agents, such as superabsorbent polymers, gums, borax and alginates, have been added to prior art animal litter to minimize this problem by increasing the integral strength and clumping ability of the prior art materials. However, such clumping agents, due to differences in their specific gravity and particle size, tend to separate from the prior art animal litter materials. As a result, the prior art litter materials with such additives create a non-homogenous end product, which does not make uniform contact with the urine and thus fails to overcome the offensive or noxious odor.

In addition to the above, another major problem encountered by the prior art animal litter materials is their potential for—dusting—. Inappropriate handling, during shipment or the action of the animals using the animal litter, creates frictional rubbing forces between the particles, which reduce particle size and generate dust. This dust can be picked up and tracked by the animal's paws and transferred to other surfaces throughout the house, such as floors and furniture. Further, handling such dust-laden animal litter exposes the environment and the user to objectionable and potentially harmful contaminants.

It has been conveniently discovered that the preferred method of the present invention animal litter for controlling or modifying odors from the deposited urine and fecal matter is by neutralization of the noxious odors. Neutralization is the permanent chemical conversion of the noxious odor into a non-toxic stable compound. The key to chemical conversion is contact of the neutralizer with the offensive odor.

The particulate form of the controlled release urethane foam product with odor control agents meets and overcomes prior art problems, particularly odors that produce objectionable olfactory sense reactions. The objectionable odors are overcome by providing agents, which react with the odors and convert them into harmless non-toxic stable chemical compounds in accordance with the following formulae:

| ACID ODOR CONTROL NEUTRALIZERS | | | |
|---|---|---|---|
| $H_2S$ + R-COONa = $Na_2S$ + NaHS | | | |
| Hydrogen | Salt in Odor | Sodium | Sodium |
| Sulfide | Control Agent | Sulfide | Hydrosulfide |
| ALKALINE ODOR CONTROL NEUTRALIZERS | | | |
| $NH_3$ + R-COOH = $R\text{-}COONH_4$ | | | |
| Ammonia | Acid in Odor | Organic Salt | |
| | Control Agent | | |

The preferred odor control agent is a proprietary amphoteric formulation using naturally occurring materials, which react with odor-causing gases of organic and inorganic materials, and converts them into odorless, stable and non-toxic compounds. It is sold in the commercial marketplace under the brand name APPTECSORB. Other odor control agents, which may operate in a different manner, such as the products sold in the commercial marketplace under the brand names ODOR-X, FEBREZE, or dio-esters from Robertet, may also be used without departing from the scope of the present invention.

The most important aspect of any odor-controlling agent is that it must be homogenously incorporated to insure contact and maximum mass transfer with the noxious odor. In addition, the litter must contain means to spread urine or other waste materials radially through the litter to prevent puddling and to insure that each formed homogenous particle will have sufficient integral strength, wet or dry, to insure that it remains dust-free during normal use.

The comminuted controlled release urethane foam product with odor-controlling agents obtained from a polymerized combination of an aqueous formulation having a limited quantity of superabsorbent polymer, at least one odor control agent from the group of acidic and alkaline odor control neutralizers, optionally and selectively at least one additive and adequate water with a predetermined ratio of hydrophilic urethane prepolymer, provides a product in which the odor control agent or agents and additives, if any, are uniformly and homogeneously disposed throughout the matrix or supporting structure of the dried and formed foam product so this product can be ground or comminuted to reduce the product to dry particles having a predetermined size in which the odor-controlling agents, if any, are uniformly and homogeneously disposed. The dry particles of this formed foam product can be packaged and sold and applied in this form for various applications and uses.

The superabsorbent polymer or copolymers in the aqueous formulation will be the same ones as above described for the earlier forms of the controlled release urethane foam products and therefore requires no additional comments.

Dependent on the particular application and use, the preferred odor control agent to react with acidic, neutral or alkaline gaseous odors can be selected from a plurality of products available from APPTECSORB. Because these commercially available products are water soluble and the hydrophilic urethane prepolymer is water activated to establish the formed foam product, variable loading of the odor control agent selected is easily obtained by changing the ratio of the selected odor control agent in the aqueous formulation mixed with the hydrophilic prepolymer to establish polymerization. Thus, active loadings in a range from 0.5% to over 90% by weight of the selected odor control agent can be obtained.

The hydrophilic urethane prepolymers are also the same as those above described for the earlier form of the controlled release urethane foam products and therefor require no further description for this comminuted form of the formed foam product in accordance with the present invention.

After the solid homogeneous controlled release urethane foam product with the odor control agents and optionally and selectively additives has been formed and dried, it can be comminuted to a size to satisfy the particular application or use. Particle sizes generally can be in a range from 60 mesh to 4 mesh and, preferably for animal litter, about 50 mesh. However, those skilled in the art will recognize the mesh size of the particles can be smaller or larger depending on the application or use for the dry homogeneous controlled release urethane foam product.

The density of the dry formed foam product created by admixing the aqueous formulation with the hydrophilic urethane prepolymer is approximately 3 lbs./cu. ft. This density can be increased by the addition of any solid fillers which aid the particular application or use. For example, clays, feldspar, sand, ground fibers etc. may be added to the odor control agent and water of the aqueous phase to effect higher densities. Densities approaching 50 lbs./cu. ft. have been achieved. In order to lower densities for an application where the product wants to float on water, for example, a solids filler such as hollow micro spheres such as 3M's K1 hollow glass beads may be added. Densities are selected based on the particular application or use. For example, a product used in a cat litter box may be designed to be lighter than conventional litter but not so light as to pick up on paws or tracked out of the animal litter box. Applications which do not require weight, such as those for controlling odor from vents in septic systems, are prepared with no filler additions. Such filler additions are incorporated into the formed foam particles and will not wash out of the particles when they are saturated. To enhance this binding, a coupling agent such as silane A1120 from OSI may be utilized as an optional additive in the makeup of the aqueous formulation. If silane is used, it is added to the aqueous formulation at approximately one percent (1%) by weight of the solids filler.

The method of forming such controlled release urethane foam product with odor control includes the steps of:

a) metering and mixing of an aqueous formulation including, a limited amount of superabsorbent polymer, at least one odor control agent or agents, optionally and selectively at least one additive, and adequate water with a predetermined ratio of hydrophilic urethane prepolymer to form a polymerizing mixture;

b) dispensing the polymerizing mixture onto a releasable bottom paper disposed on a movable carrier;

c) covering the upper surface of the polymerizing mixture with releasable top paper;

d) advancing the polymerizing mixture in the top and bottom releasable paper by moving the carrier until it is tack free and optionally sizing the formed foam layer to the desired thickness;

e) sequentially removing the top and bottom releasable paper and removing residual moisture; and f) passing the formed foam product to a comminuting device set to provide the desired particle size for the formed product and the particular application and use thereof.

As will be appreciated by those skilled in the art, the formed foam products or pads of the present invention can be fabricated to have any desired thickness and shape.

The following examples will aid in demonstrating controlled release urethane foam products in accordance with the present invention.

EXAMPLE 1

A controlled release urethane foam product for dishwashing was prepared by combining an aqueous phase containing the following ingredients by weight:

| INGREDIENTS | PERCENT BY WEIGHT |
|---|---|
| Water | 26.5 g |
| Feldspar abrasive 200 mesh | 24.63 g. |
| A 1120 Silane Union Carbide | .2 g. |
| Laurimide DEA Chemron | 1.29 g. |
| Sodium Ether Sulphonate Chemron | 6.66 g. |
| Alpha Olephin Sulphonate 40% Pilot | 5.46 g. |
| Pluronic F88 BASF | .8 g. |
| Germaben 2 Sutton Labs | .62 g. |
| Citric Acid | .05 g. |
| Color | .10 g. |
| Fragrance | .30 g. |
| with | |
| Hydrophilic Urethane Prepolymer | 33.3 g. | to provide a polymerization aqueous mixture.

The aqueous mixture was blended with high-shear mixing in a conventional metering machine, and 22 grams were dispensed into an open mold configuring the liquid mass to a defined shape. As polymerizing mass starts to rise, and prior to full rise in mold, a separate die-cut piece of abrasive non-woven fiber is placed on top of the rising foam within the mold. A cover is applied to the top of the mold and engages the upper face of the abrasive non-woven fiber to limit the expansion of the polymerizing mass to the shape of the mold. The polymerization continues with cross-linking of the urethane prepolymer into solid foam mechanically bonded to the non-woven. The final solidified product is removed from the mold and now contains the detergent system of the formula including bactericide, color and fragrance. All additives are homogenously dispersed within the foam structure.

In use, the dishwashing pad is immersed in water, and the detergent is released by squeezing of pad in contact with a dish surface. If scrubbing is desired, turning the pad over and squeezing the abrasive non-woven surface on the items being cleaned also dispenses suds.

Testing the pads on controlled lab protocol resulted in six dishes washed with suds remaining.

EXAMPLE 2

A controlled release urethane foam product for dishwashing was prepared by combining an aqueous mixture containing the following ingredients by weight:

| INGREDIENTS | PERCENT BY WEIGHT |
|---|---|
| Water | 26.5 g |
| Feldspar abrasive 200 mesh | 24.63 g. |
| A 1120 Silane Union Carbide | .2 g. |
| Laurimide DEA Chemron | 1.29 g. |
| Sodium Ether Sulphonate Chemron | 6.66 g. |

-continued

| INGREDIENTS | PERCENT BY WEIGHT |
|---|---|
| Alpha Olephin Sulphonate 40% Pilot | 5.46 g. |
| Pluronic F88 BASF | .8 g. |
| Germaben 2 Sutton Labs | .62 g. |
| Citric Acid | .05 g. |
| Color | .10 g. |
| Fragrance | .30 g. |
| Superabsorbent HS-80 Stockhausen with | .1 g. |
| Hydrophilic Urethane Prepolymer | 33.3 g. | to provide a polymerization mixture.

The manufacturing process was repeated, and use test results showed a doubling of the number of uses on the test items capable of being washed. It was concluded that the retention capacity of the superabsorbent in combination with the hydrophilicity of the foam polymer/detergent slows down the expression of the water-soluble phase when the sponge is used.

EXAMPLE 3

A controlled release urethane foam product for dishwashing with an abrasive non-woven fiber material on at least one face was formed with the same ingredients as set forth in EXAMPLE 2 except that the superabsorbent H. B. Stockhausen powder product was replaced by the following ingredients by weight:

| REPLACEMENT INGREDIENTS | PERCENT BY WEIGHT |
|---|---|
| Superabsorbent (made in situ) (H. B. Fuller PD-2072 with 4.78% by weight of Magnesium Electrons Baycoat 20) | 0.5% |

The superabsorbent differs from the H. B. Stockhausen superabsorbent in that it prevents the viscosity of the aqueous mixture from building up too fast, as occurs when the Stockhausen superabsorbent is added to the aqueous mixture, as is described in EXAMPLE 2.

This aqueous mixture was formed into a molded form product in the same manner described in EXAMPLE 1 and tested. The result of the tests were at least equal to or greater than those achieved by the molded foam product in EXAMPLE 2.

It was concluded that the controlled release urethane foam product made with the superabsorbent added to the detergent aqueous mixture as in EXAMPLES 2 and 3 produced superior results for the cleaning and scrubbing of items such as dishes and kitchenware.

EXAMPLE 4

A controlled release urethane foam product for use as a body cleansing pad was prepared by combining an aqueous mixture containing the ingredients, including a skin moisturizing and softening material by weight, as follows:

| INGREDIENTS | PERCENT BY WEIGHT |
|---|---|
| Water | 26.5 |
| Feldspar abrasive 200 mesh | 24.63 |
| A 1120 Silane OSI | .2 |
| Laurimide DEA Chemron | 1.29 |
| Sodium Ether Sulphonate Chemron | 6.66 |
| Alpha Olephin Sulphonate 40% Pilot | 5.46 |
| Pluronic F88 BASF | .8 |
| Germaben 2 Sutton Labs | .62 |
| Citric Acid | .05 |
| Color | .10 |
| Fragrance | .30 |
| Superabsorbent HS-80 Stockhausen | .1 |
| Isethionate skin softener Rhodia with | 2.0 |
| Hydrophilic Urethane Prepolymer | 31.29 |

The aqueous mixture was blended with high-shear mixing with a conventional metering machine, and the polymerizing mass was deposited onto non-woven roll goods on releasable paper disposed in a movable carrier. A top releasable paper was applied to the upper surface of the moving polymerizing mixture.

Polymerizing continued as the polymerizing mass advanced by the movable carrier until the polymerizing mass became tack-free. The top and bottom paper was removed and the sheet of moist formed foam product was advanced to a die-cut station when the sheet was cut into undivided shaped product and packaged.

Tests made on the shaped and sized formed foam product confirmed that the pads provided additional uses than similar products made without the superabsorbent ingredient.

EXAMPLE 5

A controlled release urethane foam product for use as a garbage disposal cleaner was prepared by combining an aqueous mixture containing the following ingredients by weight:

| INGREDIENTS | PERCENT BY WEIGHT |
|---|---|
| Hydrophilic Urethane Prepolymer | 25 g. |
| Aqueous Phase comprising | 75 g. |
| Water | 53.3 g. |
| Superabsorbent HS-80 Stockhausen | .45 g. |
| Wollastonite 325 mesh abrasive Nyco N.Y. | 25 g. |
| Silane A1120 OSI | .195 g. |
| Pluronic BASF | 2 g. |
| Color | .05 g. |
| Lauricidin Med-Chem Labs MI. | .75 g. |
| EDTA Akzo Nobel | .0075 g. |

The foaming process was similar to EXAMPLE 4 with the exception of eliminating the non-woven roll goods. The foam was deposited directly onto the release paper and advanced downstream till cured. The release paper was removed and the foam sheet was dried in an oven at approximately 250° F. to remove residual moisture.

The dried sheet was granulated into particles of 6–14 mesh in a Cumberland grinder. The lot of foam particles was split into two halves and continued processing included:

First Lot

To the weight of foam particles was intimately blended 1% by weight of N 300A odor control agent APPTEC N.J. To this was added 40% by weight of citric acid powder.

Second Lot

To the weight of foam particles was intimately blended 1% by weight of N 300S odor control APPTEC, and 40% by weight of Alkali Carbonate Arm & Hammer RTM Baking Soda.

Lots 1 and 2 were blended to provide a dry granulated particulate which, when placed into a running in- sink garbage disposal with water, would clean and disinfect the unit. The suds production was limited without the superabsorbent polymer which is believed to support the suds life.

EXAMPLE 6

A controlled release urethane foam product for use as a litter material was prepared by combining a formulation containing the following ingredients by weight:

| INGREDIENTS | PERCENT BY WEIGHT |
| --- | --- |
| Water | 54.36 |
| F88 Pluronic surfactant BASF | .48 |
| Feldspar filler Feldspar Corp. | 20.00 |
| Silane coupling agent A1120 OSI | .20 |
| V-Gum Regular thickener Vanderbilt | 1.6 |
| Color pigment Vivitone | 1.88 |
| Germaben II bacteriacide Germall | 1.00 |
| Superabsorbent HS80 Stockhausen with | .48 |
| Hydrophilic Urethane Prepolymer | 20.00 |

The foam sheet was processed as in EXAMPLE 5 dried, granulated and separated into two batches. To each batch was then added a 0.5% by weight of Apptec "S" or Apptec "A", odor control agent. The difference being in the control of acidic or basic odors. The two batches were then blended together to produce a litter material to control odor, maintain wet integrity, remain dust-free, be homogenous, and absorb more liquid than prior art litter. The function of the superabsorbent is to agglomerate liquids or semi-solids for removal.

EXAMPLE 7

A controlled release foam product for the washing and waxing of an automobile was prepared from a formulation comprising:

| INGREDIENTS | PERCENT BY WEIGHT |
| --- | --- |
| Water | 26.39 |
| Wollastonite filler NYCO | 13.20 |
| Silane coupling agent A1120 OSI | .13 |
| F88 Pluronic surfactant BASF | .30 |
| Maui Wash + Wax soap Chem-Quest | 26.66 |
| Superabsorbent A1120 OSI with | .20 |
| Hydrophilic Urethane Prepolymer | 33.12 |

The process of EXAMPLES 1–3 was followed without the addition of the non-woven insert in mold. The resultant 60 gram molded part cleaned an automobile 10 times with the superabsorbent versus less than 5 times without such superabsorbent. It was noted that the resulting finish maintained a gloss shine due to the silicone emulsion and wax components within the Maui proprietary blend.

EXAMPLE 8

The formulations of EXAMPLES 1, 2 and 3 substituting a fragrance material in place of the detergents was made into foam pads, and it was found that the pads exuded a fragrance for a longer period of time.

The examples described above should provide adequate details of the invention. However, it should be noted by those skilled in the art that the disclosures herein are exemplary only and that various other alternatives adaptations and modifications may be made within the scope of the present invention. Accordingly, the present invention is not limited by the specific examples as illustrated. It is therefore to be understood that numerous modifications may be made to the illustrated examples and that other arrangements may be devised without departing from the spirit and scope of the present invention as defined by the appended claims.

What is claimed is:

1. A controlled release urethane foam product comprising the reaction composition of an aqueous formulation including, superabsorbent polymer in an amount from 0.05% to 0.5% by weight of the aqueous formulation, at least one agent from the group detergents, soaps, waxes, polishes, drugs, cosmetics, biologicals, volatiles, odor absorbing and controlling compositions, water soluble chemicals, water emulsions, water mixtures with solid particles and adequate water with a predetermined ratio of hydrophilic urethane prepolymer whereby the at least one agent is generally dispersed uniformly throughout the matrix of the formed controlled release urethane foam product and slowly released on contact with a water effluent.

2. The controlled release urethane foam product as in claim 1 wherein the superabsorbent polymer is one or more from the group of polyacrylate/polyalcohol polymers and co-polymers.

3. The controlled release urethane foam product as in claim 1 or 2 including, optionally and selectively, at least one additive from the group of bacteria, live cells, plant cells, viruses, algae, fungi, cellulose fibers, phase change materials, fragrances, vaccines, spermicides, coloring and dyes.

4. The controlled release urethane foam product as in claim 1 or 2, wherein the detergent is from the group of anionic, cationic, nonionic, and zwitterionic surfactants.

5. The controlled release urethane foam product as in claim 1 or 2, wherein the wax is from the group of crystalline wax, paraffin wax, wax emulsions and silicone fluids.

6. The controlled release urethane foam product as in claim 1 or 2, wherein the polish is from the group of light mineral abrasives less than 3 on the moh hardness scale and less than 20 micron particle size.

7. The controlled release urethane foam product as in claim 1 or 2, wherein the drugs are from the group of typical over-the-counter medicaments including topical skin treatments, wound care anti-inflammatories, decongestants, disinfectants and/or insecticides.

8. The controlled release urethane foam product as in claim 1 or 2, wherein the cosmetics are from the group of materials made to improve or enhance the appearance such as vitamin E, retinol, aloe vera, hair conditioners, bath oils, suntan oils and U.V. protectants.

9. The controlled release urethane foam product as in claim 1 or 2, wherein the biologicals are from the group of plants, enzymes, bacteria and yeasts.

10. The controlled release urethane foam product as in claim 1 or 2, wherein the volatiles are from the group of fragrances, decongestants, insecticides and solvents.

11. The controlled release urethane foam product as in claim 1 or 2, wherein the odor absorbing and controlling compositions are from the group of odor neutralizers, enzymatic reactants, fragrances and anti-microbials.

12. The controlled release urethane foam product as in claim 1 or 2, wherein the superabsorbent polymer is at least 0.05% but not more than 0.5% by weight of the aqueous formulation.

13. The controlled release urethane foam product as in claim 1 or 2 wherein the at least one agent from the selected group of agents is from about 0.5% to about 15% by weight of the aqueous formulation.

14. The controlled release urethane foam product as in claim 1 or 2 wherein the water present is in a range from about 15% to about 85% by weight of the aqueous formulation.

15. The controlled release urethane foam product as in claim 1 or 2 wherein the hydrophilic urethane prepolymer is about 0.25% to 80% by weight of the aqueous formulation.

16. A controlled release urethane foam product comprising the reaction composition of an aqueous formulation including, superabsorbent polymer in an amount from 0.05% to 0.5% by weight of the aqueous formulation, at least one agent from the group detergents, soaps, waxes, polishes, drugs, cosmetics, biologicals, volatiles, odor absorbing and controlling compositions, water soluble chemicals, water emulsions, water mixtures with solid particles in an amount from 0.5% to about 40% by weight of the aqueous formulation and water in an amount of 15% to 80% by weight of the aqueous formulation with a hydrophilic urethane prepolymer in a predetermined ratio in a range from 0.25% to 80% of the aqueous formulation whereby the at least one agent is dispersed throughout the matrix of the formed controlled release urethane foam product and slowly released on contact with a water effluent.

17. A controlled release urethane foam product as in claim 16, where the aqueous formulation includes at least one surfactant in an amount from 0.5% to 15% by weight of the aqueous formulation.

18. The method for forming controlled release urethane foam products comprising the steps of:
   a. metering and mixing an aqueous formulation having superabsorbent polymer in an amount from 0.05% to 0.5% by weight of the aqueous formulation, at least one agent from the group detergents, soaps, abrasives, waxes, polishes, drugs, cosmetics, biologicals, volatiles, odor absorbing and controlling compositions, water soluble chemicals, water emulsions, water mixture with solid particles and adequate water with a predetermined ratio of hydrophilic urethane prepolymer to provide a polymerizing mixture for forming the controlled release urethane foam product;
   b. depositing the polymerizing mixture on releasable bottom paper disposed on a movable carrier;
   c. covering the upper surface of the polymerizing mixture with releasable top paper as the polymerizing mixture is moved with the carrier;
   d. advancing the polymerizing mixture in the top and bottom release paper by moving the carrier and sizing the foam layer being formed to the desired thickness until it is tack free;
   e. sequentially removing the top and bottom release paper while simultaneously drying the formed foam product to remove residual moisture; and
   f. passing the formed controlled release urethane foam product to secondary operations such as die cutting, molding and granulation to provide shaped and sized products and sized particulate products for particular applications and uses.

19. The method for forming controlled release urethane foam products comprising the steps of:
   a. metering and mixing an aqueous formulation having superabsorbent polymer in an amount from 0.05% to 0.5% by weight of the aqueous formulation, at least one agent from the group detergents, soaps, abrasives, waxes, polishes, drugs, cosmetics, biologicals, volatiles, odor absorbing and controlling compositions, water soluble chemicals, water emulsions, water mixture with solid particles and adequate water with a predetermined ratio of hydrophilic urethane prepolymer to provide a polymerizing mixture for forming the controlled release urethane foam product;
   b. dispensing a predetermined quantity of the polymerizing aqueous mixture into a shaped and sized mold; and
   c. placing a cover on the mold for to control the size and shape of the formed controlled release urethane foam product.

20. A composite polyurethane foam product for various applications and uses comprising:
   a. the reaction product of an aqueous mixture of superabsorbent polymer in an amount from 0.05% to 0.5% by weight of the aqueous mixture, at least one agent from the group of detergents, soaps, waxes, polishes, drugs, cosmetics, biologicals, volatiles, odor absorbing and controlling compositions, water soluble chemicals, water emulsions, water mixtures with solid particles and adequate water with at least one hydrophilic urethane prepolymer to provide a polymerizing mixture for forming the polyurethane foam product, and
   b. said sized, shaped and formed polyurethane foam reaction products having the at least one agent generally uniformly dispersed throughout the matrix of the sized, shaped and formed polyurethane foam reaction product to control the release of the at least one agent during the application and use thereof.

21. A controlled release urethane foam product as in claim 20, wherein the aqueous mixture includes at least one surfactant in an amount from 0.5% to about 15% by weight of the aqueous mixture.

* * * * *